Nov. 5, 1963 J. F. McKEE 3,109,444
CHECK VALVE
Filed April 5, 1961 2 Sheets-Sheet 1
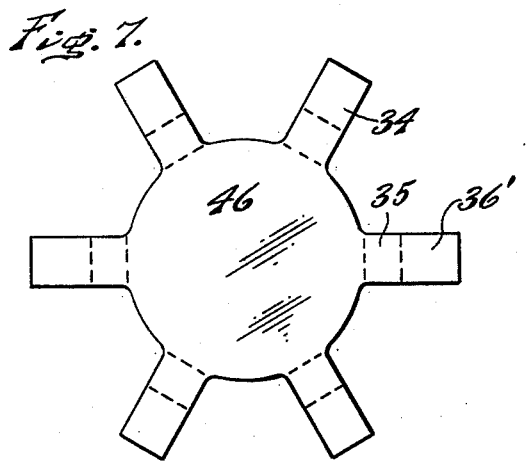
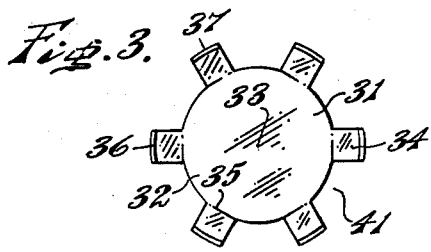
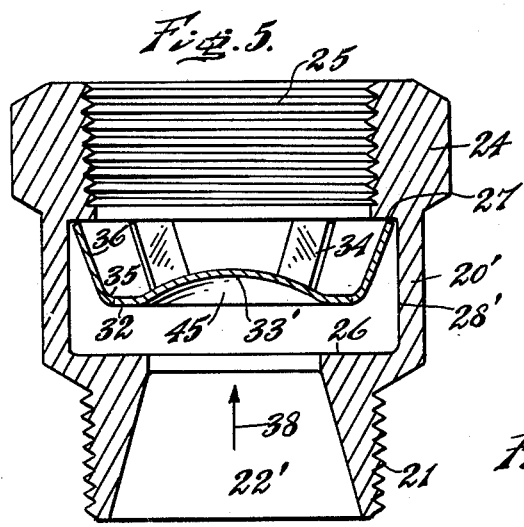
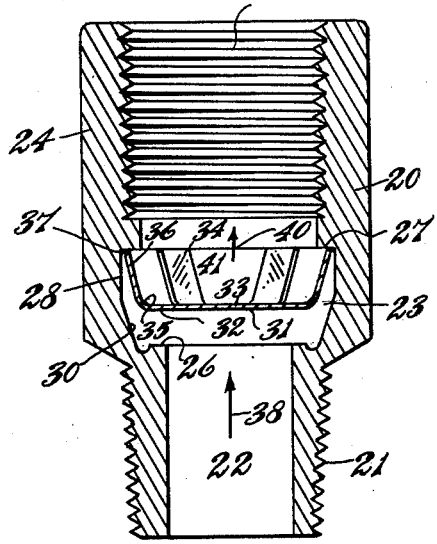
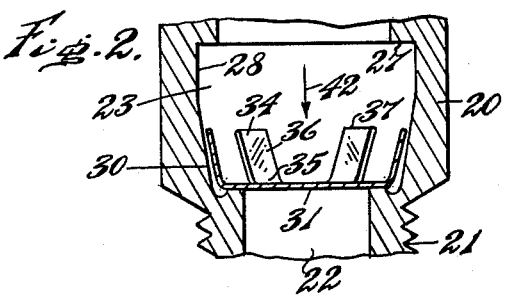
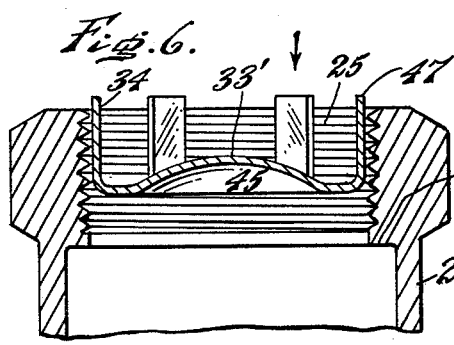
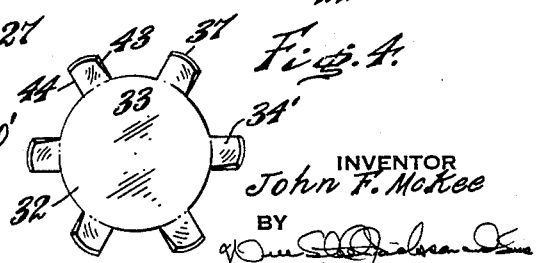
INVENTOR
John F. McKee
BY
ATTORNEYS Nov. 5, 1963 J. F. McKEE 3,109,444
CHECK VALVE Filed April 5, 1961 2 Sheets-Sheet 2

INVENTOR
John F. McKee
BY
ATTORNEYS 3,109,444
CHECK VALVE
John F. McKee, Ardmore, Pa., assignor to Yarnall-Waring Company, Philadelphia, Pa., a corporation of Pennsylvania
Filed Apr. 5, 1961, Ser. No. 100,954
5 Claims. (Cl. 137—332)

The present invention relates to check valves of the type which are intended to operate in fluid media such as steam, water, gases, chemical liquids and the like.

A purpose of the invention is to produce a check valve which will be less subject to damage by impact and which will have built-in cushioning properties.

A further purpose is to produce a check valve which is more responsive to change in flow conditions and will have less time lag in response to reversal of pressure differentials either in opening or closing.

A further purpose is to minimize the interference by a check valve to fluid flow in the system.

A further purpose is to reduce the tendency of a check valve to require maintenance because of the presence of a foreign matter in the fluid medium.

A further purpose is to make a check valve which is simpler to produce, simpler in operation, of smaller size and with a minumum of parts.

A further purpose is to produce a check valve having a sheet metal valve element which will in one direction seat on a valve seat and close the valve, and which is provided with guiding fingers or appendages deflected away from the valve seat which in another position of the valve element will engage a limiting shoulder.

A further purpose is to make the guiding fingers elastically deflectable so that the valve element can be inserted into the valve chamber without disassembling the housing.

A further purpose is to flare the guiding fingers in a direction away from the valve seat and also outwardly, providing very favorable flow conditions around the valve element when it is open.

A further purpose is to stiffen the section of the valve element by providing a dome inside the portion which engages the valve seat which is concave in the direction toward the valve seat.

A further purpose is to dispose the guiding fingers closer to the axis at one lateral edge than at the other so that rotational effect will be imparted to the valve element.

A further purupose is to provide light gage guiding fingers which are connected to the valve element only at one end and which are free to vibrate, as the valve element seats and opens, thus tending to prevent accumulation of foreign matter on the valve element.

A further purpose is to provide additional guiding fingers which do not have to deflect when the valve element is inserted in the housing, but which function to prevent the valve element from sticking in the passage through the valve seat when the valve element wobbles.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is an axial section of a check valve of the invention with the valve element in open position.

FIGURE 2 is a fragmentary view corresponding to FIGURE 1 but showing the valve element seated or closed FIGURE 3 is a plan view of the valve element employed in the check valve of FIGURES 1 and 2.

FIGURE 4 is a view similar to FIGURE 3 showing a variation in the valve element.

FIGURE 5 is an axial section showing a modified check valve of the invention with the valve element in open position.

FIGURE 6 is a fragmentary view corresponding to FIGURE 5 showing the insertion of the valve element into the valve chamber.

FIGURE 7 is a plan view of the blank used in forming the valve element of FIGURES 5 and 6.

Figure 9:
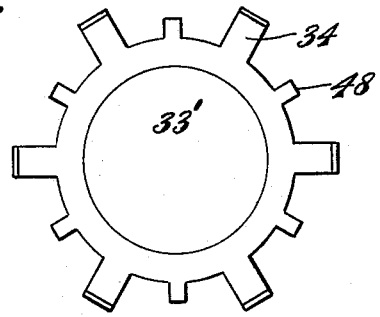
FIGURE 9 is a plan view of the valve element of FIGURE 8.

Describing in illustration but not in limitation and referring to the drawings:

Several problems exist in the construction and operation of prior art check valves of the character which may be used in steam and water lines, compressed air lines, compressed gas lines, oil lines, chemical feed lines, and generally in piping for gases and liquids.

Many such devices cause serious deterioration of the valve element and of the valve seat by impact, rendering it necessary to employ materials for the valve element and seat which are resistant to impact effects, and are correspondingly expensive. In accordance with the invention, a valve element is employed in a check valve which is a unitary or integral component formed from sheet metal suitably by stamping. Due to the relative lightness of the valve element, impact on the seating surface is reduced to a minimum, so that there is relatively little likelihood of brinelling or excessive wear. Accordingly, it is possible in some cases to employ in the present invention materials which are not highly resistant to impact, such as the softer grades of stainless steel, and where corrosion conditions are not too severe, plain carbon steel. Also, non-ferrous metals which are not of maximum hardness such as brass, bronze and beryllium copper may be used where desired.

Due to the light gage of the valve element, it remains highly resilient, and energy of impact can be dissipated by elastic deformation of the valve element when it opens or when it closes, with a resulting cushioning effect which is very desirable. Guiding fingers or appendages are provided which are free at one end and connected to the remainder of the valve element at the other end, and the guiding fingers are free to vibrate when the valve element opens and closes, and this not only dissipates energy and causes cushioning, but it also tends to dislodge any dirt or foreign matter which would otherwie adhere to the valve element.

The very low inertia of the valve element due to its low mass has another advantage. The valve element is quicker in response to reversal of pressure differential in the fluid, either for opening or for closing.

To valve of the invention even when made from relatively inexpensive materials is of long life. The tightness of the valve in closing which is aided by the ability of the valve element to deflect elastically, tends to assure that flow will be totally arrested when the valve closes, thus preventing erosion. When the valve is open the very low pressure drop across it tends to reduce the wear to a minimum. The very light gage of the valve element tends to reduce the retardant effect on flow of the fluid when the valve is open by shortening the flow passages and permitting a closer approach to streamline flow at critical cross sectional areas.

The nature of the valve element, consisting as it does of a very simple light gage stamping, tends to promote self-cleaning. Conventional check valves usually require the provision of separable bonnets which can be removed for cleaning. This is particularly true where the construction involves pivots and other closing fitting parts. The valve of the invention, on the other hand, is free to flip and flop in all directions which assists in removing any restriction imposed by accumulation of dirt or other foreign matter. The elastic deflectability of the guiding fingers and the ability of the guiding fingers to vibrate as the valve element flips and flops and the freedom of the valve element to rotate also tend to maintain agitated conditions in the valve control chamber which will facilitate removal of foreign matter by the fluid flowing through the control chamber, and will tend to produce conditions unfavorable to deposit of foreign matter in the valve control chamber.

Thus, the device of the invention is very reliable for prolonged operation without need for cleaning by disassembly. This is an important feature because the valve is constructed in line, and disassembly would require separation of piping and the like.

The promotion of conditions favorable to self-cleaning can be accomplished by bending the guiding fingers so that they are closer to the axis at one lateral edge than at the other and thus function as vanes to cause rotation of the valve element and creation of conditions unfavorable to the deposit of dirt.

The in-line relation of the housing and valve element is favorable to low pressure drop and low turbulence. This permits a smaller check valve to perform the required function than would otherwise be required, encouraging economy and compactness. This permits utilization of the check valve in a manner which would ordinarily not be possible. The dimensions from the standpoint of length can suitably be of the same order as a pipe coupling for the particular size of pipe intended. Thus, the valve of the invention can be applied in a steam trap body within a length of about one and one-half times the pipe diameter without greatly increasing the length of the steam trap. The actual valve chamber need have a length only about one-half the pipe diameter.

Even where the valve has a separate housing, it will only have a housing length of about twice the pipe diameter.

One of the advantages of the device of the invention is that the housing need not be disassembled to insert the valve element. The valve element can simply be pushed in, deflecting the guiding fingers from their usual angle of about 120° to an angle of about 90° as they pass through the entering passage. Then the guiding fingers will spring out elastically to occupy the valve control chamber.

In the preferred embodiment of the invention, particularly in large sizes, precautions will be taken to develop a suitable depth of section to withstand the pressure conditions encountered. This may to advantage be done by providing a dome which is concave in the direction toward the valve seat.

Considering first the form of FIGURES 1 to 3, inclusive, I there illustrate a check valve housing 20 having a male threaded fitting 21 at one end provided with a desirably straight internal passage 22, a valve control chamber 23 in line with the passage 22 and communicating with it, and then a female fitting 24 at the opposite end having a threaded internal passage 25 which is in straight line relation to the passage 22 and the valve control chamber 23.

The housing 20 may be of any suitable material such as stainless steel, bronze, plain carbon steel or the like, with suitable corrosion protection as required. The housing may also be produced from plastic materials such as nylon and phenol-formaldehyde where the temperatures and the character of the fluid content permit.

The valve control chamber is provided at the end adjoining the passage 22 with a radially outwardly extending flat valve seat 26 which is desirably flat and transverse to the axis of the housing.

At the opposite end adjoining the passage 25, the valve control chamber is provided with a valve limiting shoulder 27 which is desirably flat and transverse to the axis.

In the form of FIGURES 1 and 2, the valve control chamber has a portion of its side wall 28 adjoining the limiting shoulder 27 which is cylindrical and a portion close to the valve seat at 30 which is conical, but which avoids interference with the valve element as later explained.

The valve element in the form of FIGURES 1 to 3 is a unitary or integral piece of sheet metal 31 which has a thickness of between 2 and 8 percent, and preferably 3 and 6 percent, of the diameter of the opening 22 at the valve seat.

The valve element has an annular valve seating portion 32 which is adapted to engage the valve seat 26 when the valve is closed and as part of the same flat disc in this form has a center valve closure portion 33. Outside the valve seating portion and at spaced positions around the valve are placed guiding fingers or appendages 34. The guiding fingers are reversely bent at 35 with respect to the valve seating portion 32 at an angle preferably of about 120° and have generally outwardly diverging flat portions 36 which extend away from the valve seat, terminating in upper edges 37 which in open position of the valve as shown in FIGURE 1 engage against the limiting shoulder 27, but with adequate clearance from the side walls 28 so as to permit the valve element in intermediate position to flip and flop and clean itself. The radial clearance in a half inch valve should be of the order of 1/64" to 1/32" on each side and may be proportionately greater in larger valves.

The valve element may be made of metal such as stainless steel, beryllium copper, steel or suitable nonmetal, for example plastic such as phenolic plastic, suitably in sheet form.

In operation as shown in FIGURES 1 and 2, when the preponderant pressure differential indicates mainstream flow as shown by arrow 38 in FIGURE 1, the valve is open and the outer edges 37 of the guiding fingers 34 engages the limiting shoulder 27 while flow as suggested by arrow 40 takes place through spaces 41 intervening between the guiding fingers 34, which suitably cover less than half of the circumference of the valve element and preferably less than one-third.

When the pressure differential reverses, as shown in FIGURE 2, to produce a tendency to flow in the direction of arrow 42, the valve, being of low mass and therefore low inertia, closes very quickly without severe impact and dissipates energy by elastic deflection of the valve element to cause very effective seating and also by vibration of the guiding fingers 34.

In the form of FIGURE 4 the guiding fingers 34' have been bent or cocked so that their lateral edges 43 are closer to the center or axis than the opposite lateral edges 44, so that the guiding fingers 34' now act like vanes and impart a rotational effect to the valve element on top of the flipping and flopping previously referred to.

Except for this rotational effect, the valve element of FIGURE 4 functions in the same manner as that of FIGURES 1 to 3 inclusive.

FIGURES 5 to 7 illustrate a modified form of check valve housing 20' which is designed especially for a larger check valve. In this case the outside surface 28' of the valve control chamber is entirely cylindrical. The passage 22' is somewhat tapering.

The closure portion 33' of the valve element is dome-shaped, thus increasing the depth of section and the strength to resist pressure when closed, and creating a concave portion 45 directed toward the valve seat when the valve is open.

This causes the fluid flow in the direction which maintains the valve open as shown by arrow 38 to impinge in the concave 45.

The blank 46 from which the valve element is bent has an area 35' at the base of the guiding fingers in which the 120° bend is formed and a straight portion 36' which will form the outside straight part 36.

The valve element prior to insertion in the valve is desirably of the same shape as after insertion. As a measure of economy, the housing is desirably made of a single piece without any separable bonnet. The valve is then simply forced in through the passage 25 as shown in FIGURE 6, deflecting the fingers 34 inwardly until they achieve approximately a 90° relation as shown at 47 while the valve element is passing through the passage 25 and then allowing the fingers to elastically deform outwardly to their approximately 120° relation to the valve seating area 32 as previously described.

Except as noted above, the operation of the device of FIGURES 5 to 7 will be the same as that of the device of FIGURES 1 to 3.

Figure 8:
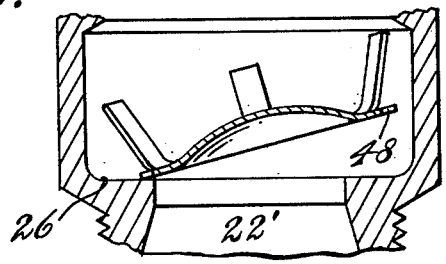
FIGURE 8 is a fragmentary axial section of a valve element of the character shown in FIGURE 5 in a valve control chamber. The valve element has additional guiding fingers within the limits of the diameter of the passage through which the valve element is inserted to prevent the valve element from sticking in the opening through the valve seat when the valve element wobbles.

The valve element in the various forms shown has a tendency to wobble. In the angularly disposed position, there may be a tendency for the valve element to stick in the opening 22' through the valve seat, and to prevent this additional fingers 48 are provided intervening between the guiding fingers 34, as shown in FIGURES 8 and 9, so as to engage the valve seat 26 and prevent sticking in the valve seat opening 22'. The fingers 48 are of larger diameter than opening 22' but smaller than the diameter of the opening through which the valve seat was inserted. The fingers 48 extend out beyond the guiding fingers 34 as they adjoin the valve seat.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a check valve, a housing having an opening at one end, an opening at the other end and a valve control chamber commuicating between the two openings, the valve control chamber having a flat seat at one end extending outwardly transverse to the length, and a limiting shoulder at the other end extending outwardly transverse to the axis, in combination with a valve element in the valve control chamber, in one position engaging the seat and closing off flow and in another position engaging the limiting shoulder, the valve element being of sheet material comprising a flat seat engaging portion which in one position engages the valve seat and closes the valve, a valve closure portion inside the seat engaging portion and spaced guiding fingers extending progressively outwardly in a conical plane from the seat engaging portion and deflected in the direction remote from the valve seat, said guiding fingers in one position of the valve engaging said limiting shoulder.

2. A check valve of claim 1, in which said seat engaging portion is of a diameter smaller than one of said openings, and in which said progressively outwardly extending guiding fingers of the valve element when in the valve control chamber extend to a diameter larger than said one opening in the housing, said valve element being insertable through said one opening in the housing by deflecting said guiding fingers inwardly.

3. A check valve of claim 1, in which said guiding fingers are nearer to the center of the valve element at one edge than at an opposite edge and exert a rotational effect in contact with the medium in the valve.

4. A check valve of claim 1, in combination with fingers sticking out from the valve element to a distance beyond the diameter of the guilding fingers as they adjoin the valve seating portion of the valve element and preventing the valve element from sticking in the opening through the valve seat when the valve element wobbles.

5. A check valve of claim 1, in which the valve element has a thickness of between 2 and 8 percent the diameter of the opening through the valve seat.

References Cited in the file of this patent

UNITED STATES PATENTS

| 883,928 | Batchelder | Apr. 7, 1908 |
| 1,189,293 | Robinson | July 4, 1916 |
| 2,585,773 | Hartman | Feb. 12, 1952 |

FOREIGN PATENTS

| 503,581 | Canada | June 8, 1954 |